(12) United States Patent
Han et al.

(10) Patent No.: US 11,403,489 B2
(45) Date of Patent: Aug. 2, 2022

(54) TARGET OBJECT PROCESSING METHOD AND APPARATUS, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Shixin Han, Beijing (CN); Yu Guo, Beijing (CN); Hongwei Qin, Beijing (CN); Yu Zhao, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 37 days.

(21) Appl. No.: 16/901,190

(22) Filed: Jun. 15, 2020

(65) Prior Publication Data
US 2020/0311476 A1    Oct. 1, 2020

Related U.S. Application Data

(63) Continuation of application No. PCT/CN2019/101448, filed on Aug. 19, 2019.

(30) Foreign Application Priority Data

Jan. 31, 2019   (CN) ......................... 201910098735.5

(51) Int. Cl.
*G06K 9/62*   (2022.01)
*G06N 3/08*   (2006.01)
*G06V 20/40*  (2022.01)

(52) U.S. Cl.
CPC ......... *G06K 9/6257* (2013.01); *G06K 9/6262* (2013.01); *G06N 3/08* (2013.01); *G06V 20/40* (2022.01); *G06V 2201/07* (2022.01)

(58) Field of Classification Search
CPC ............ G06K 9/6257; G06K 9/00711; G06K 9/6262; G06K 2209/21; G06N 3/08
(Continued)

(56) References Cited

U.S. PATENT DOCUMENTS

| 8,582,807 | B2 | 11/2013 | Yang |
| 9,619,753 | B2 | 4/2017 | Chang et al. |
| 2008/0113672 | A1 | 5/2008 | Karr |
| 2011/0222724 | A1 | 9/2011 | Yang |

(Continued)

FOREIGN PATENT DOCUMENTS

| CN | 103366163 A | 10/2013 |
| CN | 106097346 A | 11/2016 |

(Continued)

OTHER PUBLICATIONS

International Search Report in the international application No. PCT/CN2019/101448, dated Oct. 29, 2019, 2 pgs.

(Continued)

*Primary Examiner* — Michael R Neff
(74) *Attorney, Agent, or Firm* — Cooper Legal Group, LLC

(57) ABSTRACT

Provided are a target object processing method and apparatus, and a storage medium. The method includes: inputting first data into a first processing module to obtain a predicted data annotation result; inputting the data annotation result into a second processing module, and performing scene-adaptive incremental learning according to the data annotation result to obtain a neural network adapted to a scene of second data; and processing a scene corresponding to a target object according to data including the target object and the neural network.

13 Claims, 5 Drawing Sheets

(58) Field of Classification Search
USPC .......................................................... 382/103
See application file for complete search history.

(56) References Cited

U.S. PATENT DOCUMENTS

| 2016/0189048 | A1 | 6/2016 | Chang et al. | |
|---|---|---|---|---|
| 2018/0314935 | A1 | 11/2018 | Lewis et al. | |
| 2020/0111447 | A1* | 4/2020 | Yaacob | G06K 9/3233 |
| 2020/0202168 | A1* | 6/2020 | Mao | G06K 9/6292 |
| 2021/0227126 | A1* | 7/2021 | Se | G06N 5/04 |

FOREIGN PATENT DOCUMENTS

| CN | 106488739 | A | 3/2017 |
|---|---|---|---|
| CN | 106529485 | A | 3/2017 |
| CN | 106919980 | A | 7/2017 |
| CN | 107358257 | A | 11/2017 |
| CN | 107851213 | A | 3/2018 |
| CN | 107944374 | A | 4/2018 |
| CN | 108229591 | A | 6/2018 |
| CN | 108545556 | A | 9/2018 |
| CN | 108764269 | A | 11/2018 |
| CN | 108764487 | A | 11/2018 |
| CN | 109224442 | A | 1/2019 |
| CN | 109242013 | A | 1/2019 |
| CN | 109766954 | A | 5/2019 |
| TW | 200415524 | A | 8/2004 |

OTHER PUBLICATIONS

First Office Action of the Chinese application No. 201910098735.5, dated May 28, 2020, 16 pgs.

"Overcoming Catastrophic Forgetting in Neural Networks"; Mar. 2017, James Kirkpatrick, Razvan Pascanu, Neil Robinowitz, Joel Veness, Guillaume Desjardins, Andrei A. Rusu, Kieran Milan, John Quan, Tiago Ramalho, Agnieszka Grabska-Barwinska, Demis Hassabis, Claudia Clopath Dharshan Kumran and Raia Hadsell; Proceedings of the National Academy of Sciences of the United States of America, vol. 114, No. 13, pp. 3521-3626.

"Online Model Distillation for Efficient Video Inference"; Dec. 2018; Ravi Teja Mullapudi, Steven Chen, Keyi Zhang, Deva Ramanan and Kayvon Fatahalian; Computer Science; Computer Vision and Pattern Recognition, 12 pgs.

"Incremental Learning of Object Detectors without Catastrophic Forgetting"; Aug. 2017; Konstantin Shmelkov, Condelia Schmid and Karteek Alahari; Computer Science; Computer Vision and Pattern Recognition 10 pgs.

"Transferable Joint Attribute-Identity Deep Learning for Unsupervised Person Re-Identification"; Mar. 2018; Jingya Wang, Xiatian Zhu, Shaogang Gong and Wei Li; Computer Scienece, Computer Vision and Pattern Recognition, 10 pgs.

Notice of Allowance of the Chinese application No. 201910098735. 5, dated Nov. 9, 2020, 4 pgs.

* cited by examiner

TARGET OBJECT PROCESSING METHOD AND APPARATUS, ELECTRONIC DEVICE, AND STORAGE MEDIUM

CROSS-REFERENCE TO RELATED APPLICATIONS

The present application is a continuation of International Patent Application No. PCT/CN2019/101448, filed on Aug. 19, 2019, which claims priority to Chinese Patent Application No. 201910098735.5, filed on Jan. 31, 2019. The disclosures of International Patent Application No. PCT/CN2019/101448 and Chinese Patent Application No. 201910098735.5 are hereby incorporated by reference in their entireties.

BACKGROUND

In the related art, training data is obtained by performing model training in a cloud. However, the obtained training data is different from data in an actual application scene, and different application scenes have different detection requirements. Therefore, the training data obtained by performing model training in the cloud is not applicable to all application scenes.

In addition, collecting and training data for each application scene is not feasible or is costly.

SUMMARY

The present disclosure relates to the field of computer vision technologies, and in particular, to a target object processing method and apparatus, an electronic device, and a storage medium. The present disclosure provides target object processing technical solutions.

According to a first aspect of the present disclosure, provided is a target object processing method, applied to an edge device for deploying a first processing module for annotation of first data and a second processing module for adaptation of a scene indicated by second data on the edge device. The method includes: inputting the first data into the first processing module to obtain a predicted data annotation result; inputting the data annotation result into the second processing module, and performing scene-adaptive incremental learning according to the data annotation result to obtain a neural network adapted to the scene of the second data; and processing a scene corresponding to a target object according to data including the target object and the neural network.

According to a second aspect of the present disclosure, provided is a target object processing apparatus, deployed on an edge device and including a first processing module, a second processing module, and a third processing module, where the first processing module is configured to obtain a predicted data annotation result according to input first data; the second processing module is configured to perform scene-adaptive incremental learning according to the input data annotation result to obtain a neural network adapted to a scene of the second data; and the third processing module is configured to process a scene corresponding to a target object according to data including the target object and the neural network.

According to a third aspect of the present disclosure, provided is an electronic device, including: a processor; and a memory configured to store processor executable instructions, where the processor is configured to perform the method according to any one of the foregoing possible implementations.

According to a fourth aspect of the present disclosure, provided is a computer storage medium having executable instructions stored thereon, where the executable instructions, when being are executed by a processor, enable the processor to implement the method according to any one of the foregoing possible implementations.

In the present disclosure, the first processing module for annotation of first data and the second processing module for adaptation of a scene indicated by second data are deployed on an edge device, and the first data is input into the first processing module to obtain a predicted data annotation result; the data annotation result is input into the second processing module, and scene-adaptive incremental learning is performed according to the data annotation result to obtain a neural network adapted to the scene of the second data; and a scene corresponding to a target object is processed according to data including the target object and the neural network. After the neural network adapted to the scene of the second data is obtained using scene-adaptive incremental learning in the present disclosure, the scene corresponding to the target object may be processed according to the data including the target object and the neural network (for example, when the target object is a face or a body, image detection processing on the body or the face is implemented), and a difference between obtained training data and data in an actual application scene is not large. In this way, the processing requirement of an application scene is met, and costs are reduced.

It should be understood that the foregoing general descriptions and the following detailed descriptions are merely exemplary and explanatory, but are not intended to limit the present disclosure.

Other features and aspects of the present disclosure can be described more clearly according to the detailed descriptions of the exemplary embodiments in the accompanying drawings.

BRIEF DESCRIPTION OF DRAWINGS

The accompanying drawings herein are incorporated into the specification and constitute a part of the specification. These accompanying drawings show embodiments that are in accordance with the present disclosure, and are intended to describe the technical solutions in the present disclosure together with the specification.

DETAILED DESCRIPTION

Figure 1:
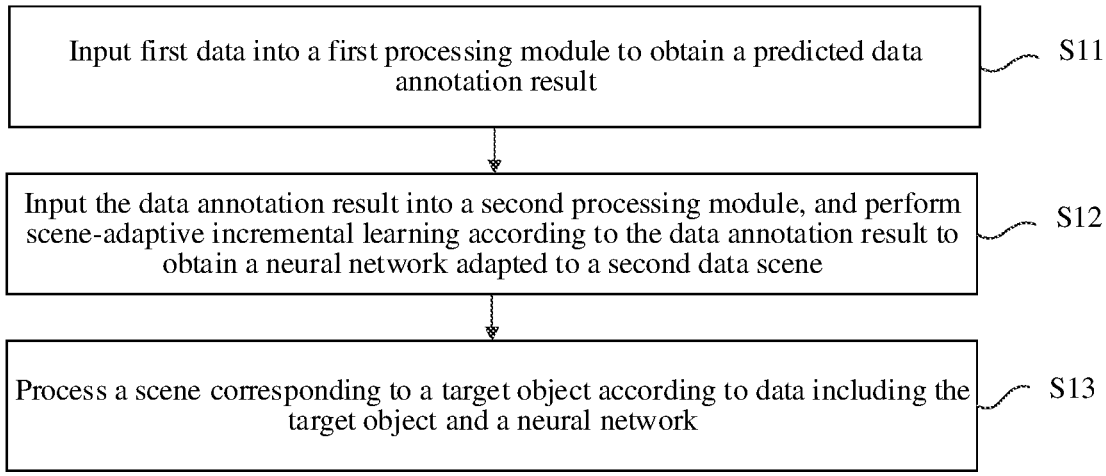
FIG. 1 is a first flowchart of a target object processing method according to exemplary embodiments.

The various exemplary embodiments, features, and aspects of the present disclosure are described below in detail with reference to the accompanying drawings. Same reference numerals in the accompanying drawings represent elements with same or similar functions. Although various aspects of the embodiments are illustrated in the accompanying drawing, the accompanying drawings are not necessarily drawn in proportion unless otherwise specified.

The special term "exemplary" here refers to "being used as an example, an embodiment, or an illustration". Any embodiment described as "exemplary" here is not necessarily to be interpreted as superior to or better than other embodiments.

The term "and/or" herein only describes an association relationship for describing associated objects and represents that three relationships may exist. For example, A and/or B may represent the following three cases: A exists separately, A and B exist at the same time, and B exists separately. In addition, the term "at least one" herein indicates any one of multiple listed items or any combination of at least two of multiple listed items. For example, including at least one of A, B, and C may mean including any one or more elements selected from a set consisting of A, B, and C.

In addition, for better illustration of the present disclosure, various specific details are given in the following specific implementations. A person skilled in the art should understand that the present disclosure may also be implemented without some specific details. In some examples, methods, means, elements, and circuits well known to a person skilled in the art are not described in detail so as to highlight the subject matter of the present disclosure.

In the related art, incremental learning is a model training scheme in which a better effect is achieved for a model according to new data during continuous adding and training of the new data. In an incremental learning method, training is usually performed on two (or more) different data sets. Taking two data sets as an example, training is first performed in a data set A, and then training is performed in a data set B. The focus is on maintaining a basically unchanged prediction effect in the data set A while achieving a good prediction effect in the data set B.

In the training process of the data set B, the importance of a parameter of the model in the data set A is estimated to control a gradient weight of the parameter during training in the data set B. In the actual situation, it is more desirable that the model performs better in the data set B (an application scene on an edge device), and the performance of the model in the data set A (an online test set in a cloud) is not important.

Data-driven machine learning usually performs well when an input similar to training data is processed. However, when the input greatly differs from the training data, a general model may perform poorly because a spatial relationship between a feature of data-driven machine learning and the general feature significantly changes. In addition, collecting and training data for each application scene is not feasible or is costly. The following embodiments of the present disclosure are adopted to implement scene-adaptive incremental learning. In the scene-adaptive incremental learning method, an online model (annotated as model S) is built into an edge device, and an offline model (annotated as model T) that has higher precision but is not impractical in speed is further designed. After the edge device is deployed in an application scene, the prediction of application scene data by the model T is used as an annotation, and the model S is incrementally trained on the edge device, so that the model S is adapted to the application scene, thereby achieving better processing performance In addition, different learning strategies may be further designed, so that performance of the model S is maximized with as few iterations as possible. During scene switching, the model S is reset to ensure initial performance of the model, and then the processing performance of the model is trained and improved in a new application scene.

FIG. 1 is a first flowchart of a target object processing method according to exemplary embodiments. The target object processing method is applied to a target object processing apparatus, and a first processing module for annotation of first data and a second processing module for adaptation of a scene indicated by second data are deployed on an edge device. For example, the target object processing apparatus may be executed by a terminal device, a server, or another processing device. The terminal device may be User Equipment (UE), a mobile device, a cellular phone, a cordless phone, a Personal Digital Assistant (PDA), a handheld device, a computing device, an in-vehicle device, or a wearable device. In some possible implementations, the target object processing method may be implemented in a manner in which a processor invokes computer readable instructions stored in a memory. As shown in FIG. 1, the procedure includes the following steps.

At step S11, first data is input into a first processing module to obtain a predicted data annotation result.

At step S12, the data annotation result is input into a second processing module, and scene-adaptive incremental learning is performed according to the data annotation result to obtain a neural network adapted to a scene of second data.

At step S13, a scene corresponding to a target object is processed according to data including the target object and the neural network.

In the present disclosure, the first processing module and the second processing module may be obtained according to an operation model. For example, the first processing module may be model T, and the second processing module may be model S. The first data is raw data obtained by collecting the target object. For example, in an application scene of image detection, the first data may include body image data and face image data, or may include either body image data or face image data. The model T may be an offline model, and the model S may be an online model. Second data is scene data and is for scene adaptation.

Application scenes applicable to the present disclosure include target detection, target recognition, example segmentation, super-resolution, reinforcement learning, and the like. Taking target detection in a monitoring scene as an example, face or body detection is performed on an edge device by using a current intelligent camera. Because a computing capability is limited, a relatively large model cannot be used. Monitoring scenes in different regions greatly differ, and therefore a general-purpose model on the device cannot achieve good performance in various scenes. However, when the position of a collection device (such as a camera) for target object collection is fixed, a scene of the collection device is solidified (a background is relatively simple). For target recognition, example segmentation, super-resolution, reinforcement learning, and other scenes, although specific implementations are different, the difficulty in scene adaptation is a common problem. That is, on the one hand, the costs of training a model for each scene are too high; on the other hand, when the position of the collection device (such as the camera) is fixed, a processing task (such as target detection) of a target object becomes simpler. According to the processing procedure in FIG. 1 of the present disclosure, a model may be incrementally trained for a specific scene by using a computing capability of the edge device in an idle state, so that a task processing capability (such as the detection rate of target detection) in the specific scene may be effectively improved.

In optional implementations, in a target detection scene, the first data includes body image data or face image data. The model T for annotation of the body image data or the face image data and the model S for adaptation of the scene of the second data are deployed on the edge device (such as an edge node), and the body image data or the face image data is input into the model T to obtain a predicted data annotation result. The data annotation result is input into the model S, and scene-adaptive incremental learning is performed according to the data annotation result to obtain a neural network adapted to the scene of the second data. For example, in the target detection scene, a body image or a face image may be detected according to the data including the target object and the neural network.

Because the present disclosure does not rely on manual data annotation, online incremental learning is feasible. The model T and the model S are iterated online on the edge device and a cloud, and a product adapts to different application scenes after delivery, thereby improving the performance In addition, taking the iteration of the model T and the model S on the edge device as an example, because networking is not required, information is not prone to leakage, so that user privacy is protected. If the product is used in an application scene such as security protection, a mobile phone, or self-driving, a personalized adaptive update of a model and retraining of the model are implemented by means of online incremental learning.

In examples, for target detection in a monitoring scene, face detection or body detection is performed on an edge device by using a current intelligent camera. Because the processing capability (the computing capability) of the edge device is limited, a relatively large model cannot be used. Moreover, monitoring scenes in different regions greatly differ, and therefore a general-purpose model on the edge device cannot achieve good performance in various monitoring scenes. In addition, after the edge device is fixed, a scene of the edge device is solidified and is relatively simple. In view of the above, the model T is more precise than the model S, but because the amount of sample data is relatively large, the model T is a large model and has a slower processing speed. Although the model S is not precise enough, a processing speed of the model S is fast enough. Therefore, the model T and the model S are combined to train and learn sample data, to meet an expected processing requirement. The model T and the model S are deployed on the edge device, so that image data is independently detected and processed on the edge device without cloud networking. Because the entire process may be independently completed on the edge device without networking, user privacy data may be protected. Data is annotated by means of the prediction of application scene data by the model T, thereby eliminating dependence on manual data annotation. The data annotation result is used for data training of the model S, such as on-cloud incremental training on the edge device, to implement scene-adaptive incremental learning, so that the model S is adapted to an application scene and model performance is improved. The neural network adapted to the scene of the second data is obtained. For example, in an application scene of target detection, image data may be detected according to the data including the target object and the neural network, and a difference between the obtained training data and data in an actual application scene is not large. In this way, a detection requirement of an application scene is met, and costs are reduced. In this case, data collection and training are not required for each application scene, because the obtained training data is applicable to all application scenes.

Figure 2:
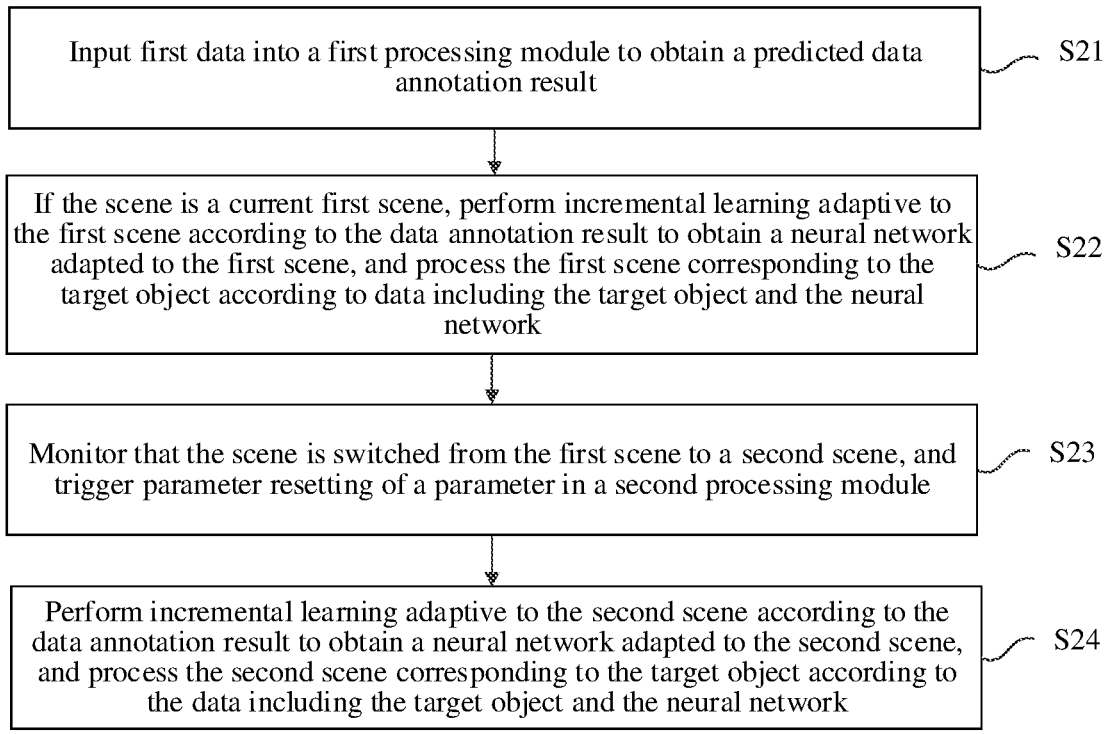
FIG. 2 is a second flowchart of a target object processing method according to exemplary embodiments.

FIG. 2 is a second flowchart of a target object processing method according to exemplary embodiments. The target object processing method is applied to a target object processing apparatus. For example, the target object processing apparatus may be executed by a terminal device, a server, or another processing device. The terminal device may be a UE, a mobile device, a terminal, a cellular phone, a cordless phone, a PDA, a handheld device, a computing device, an in-vehicle device, or a wearable device. In some possible implementations, the target object processing method may be implemented in a manner in which a processor invokes computer readable instructions stored in a memory. A first processing module for annotation of first data and a second processing module for adaptation of a scene indicated by second data are deployed on an edge device. As shown in FIG. 2, the procedure includes the following steps.

At step S21, first data is input into a first processing module to obtain a predicted data annotation result.

At step S22, if the scene is a current first scene, incremental learning adaptive to the first scene is performed according to the data annotation result to obtain a neural network adapted to the first scene, and the first scene corresponding to a target object is processed according to data including the target object and the neural network.

At step S23, it is monitored that the scene is switched from the first scene to a second scene, and parameter resetting of a parameter in a second processing module is triggered.

At step S24, incremental learning adaptive to the second scene is performed according to the data annotation result to obtain a neural network adapted to the second scene, and the second scene corresponding to the target object is processed according to the data including the target object and the neural network.

In the present disclosure, the first processing module and the second processing module may be obtained according to an operation model. For example, the first processing module may be model T, and the second processing module may be model S. In a target detection scene, the first data may include body image data and face image data, or may include either body image data or face image data. The model T may be an offline model, and the model S may be an online model. The model T and the model S may be two network models of different scales. The model T may use a relatively large network structure, so that the model T has a strong prediction capability, and the model S serves as an actual model used in a product of an application scene. The model T is used for predication in advance for inflow of new data, and the obtained prediction result is used as an annotation and is used for training and learning for a small model. During scene switching, the model S is reset to ensure initial performance of the model, and then processing performance of the model is trained and improved in a new application scene.

Restriction on the model S may also ensure the initial performance of the model S, and then the processing performance of the model is trained and improved in the new application scene. In optional implementations, in condition that the parameter in the second processing module is to be updated, the updating of the parameter is restricted according to a constraint condition. For example, the updating of the parameter is restricted by means of a weight matrix. The purpose is to make the second processing module (the model S) retain some initial statues (during initial deployment) in the change process, thereby retaining a parameter solidification feature, and avoiding over-fitting due to excessive attention to a current scene.

In optional implementations, inputting first data into the first processing module to obtain the predicted data annotation result includes: obtaining a prediction rule according to prediction of scene data by the first processing module; and annotating the first data according to the prediction rule to obtain the predicted data annotation result.

In optional implementations, there are at least two sources for the predicted data annotation result obtained by means of the first processing module. The first processing module may be understood as an annotation source.

I. If an output result of the first processing module is used as an input of the second processing module, the predicted data annotation result is derived from a first output of a data sample training network output layer constituting the first processing module.

II. If the output result of the first processing module and an output result of an intermediate layer are used as the input of the second processing module, the predicted data annotation result is derived from the first output of the data sample training network output layer constituting the first processing module and a second output of the intermediate layer.

Figure 3:
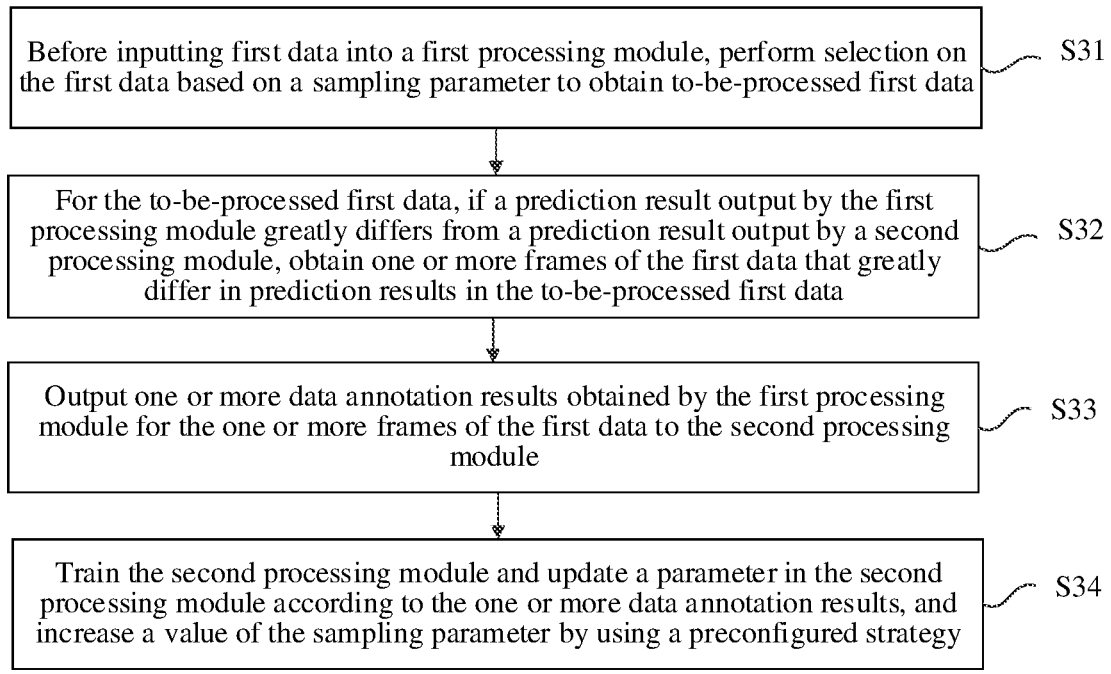
FIG. 3 is a third flowchart of a target object processing method according to exemplary embodiments.

FIG. 3 is a third flowchart of a target object processing method according to exemplary embodiments. The target object processing method is applied to a target object processing apparatus. For example, the target object processing apparatus may be executed by a terminal device, a server, or another processing device. The terminal device may be a UE, a mobile device, a cellular phone, a cordless phone, a PDA, a handheld device, a computing device, an in-vehicle device, or a wearable device. In some possible implementations, the target object processing method may be implemented in a manner in which a processor invokes computer readable instructions stored in a memory. As shown in FIG. 3, the procedure includes the following steps.

At step S31, before first data is input into a first processing module, selection is performed on the first data according to a sampling parameter to obtain to-be-processed first data.

For example, the sampling parameter is the sampling frequency.

At step S32, for the to-be-processed first data, if a prediction result output by the first processing module greatly differs from a prediction result output by a second processing module, one or more frames of the first data that greatly differ in prediction results in the to-be-processed first data are obtained.

It should be noted that the standard for a large difference may be set or adjusted according to a client requirement or a design requirement.

At step S33, one or more data annotation results obtained by the first processing module for the one or more frames of the first data are output to the second processing module.

At step S34, the second processing module is trained and a parameter in the second processing module is updated according to the one or more data annotation results, and a value of the sampling parameter is increased by using a preconfigured strategy.

In steps S31 to S34, performing scene-adaptive incremental learning on the edge device to obtain a neural network adapted to the scene of the second data is merely an optional implementation.

In another optional implementation, selection is performed on the first data according to the sampling parameter (such as the sampling frequency) to obtain to-be-processed first data. For the to-be-processed first data, if the prediction result output by the first processing module slightly differs from the prediction result output by the second processing module, the value of the sampling parameter is reduced by using the preconfigured strategy.

In still another optional implementation, the method further includes: before inputting the first data into the first processing module, using a part of the first data as an online test set; and for first data in the online test set, if the prediction result output by the first processing module greatly differs from the prediction result output by the second processing module, resetting a parameter in the second processing module.

In a first optional implementation, the method further includes: after scene-adaptive incremental learning is performed to obtain a neural network, if the neural network is used to process a certain application scene, monitoring a plurality of edge devices in a plurality of regions to obtain a first edge device in an idle state; and performing adaptive incremental training adapted to the scene of the second data on the second processing module according to an edge device processing capability corresponding to the first edge device.

In a second optional implementation, the method further includes: after scene-adaptive incremental learning is performed to obtain the neural network, if the neural network is used to process a certain application scene, monitoring a plurality of edge devices in a plurality of regions to obtain a plurality of edge device processing capabilities; selecting, from the plurality of edge devices, a second edge device with a high processing capability according to processing capabilities respectively corresponding to the plurality of edge devices and the current resource consumption; and performing adaptive incremental training adapted to the scene of the second data on the second processing module according to the edge device processing capability corresponding to the second edge device.

By means of the foregoing two optional implementations, incremental training may be performed on a model in a specific scene, thereby effectively improving the detection rate of target object detection in the specific scene. If the processing capability of the edge device is stronger, the processing speed and processing efficiency of adaptive incremental training are improved.

Figure 4:
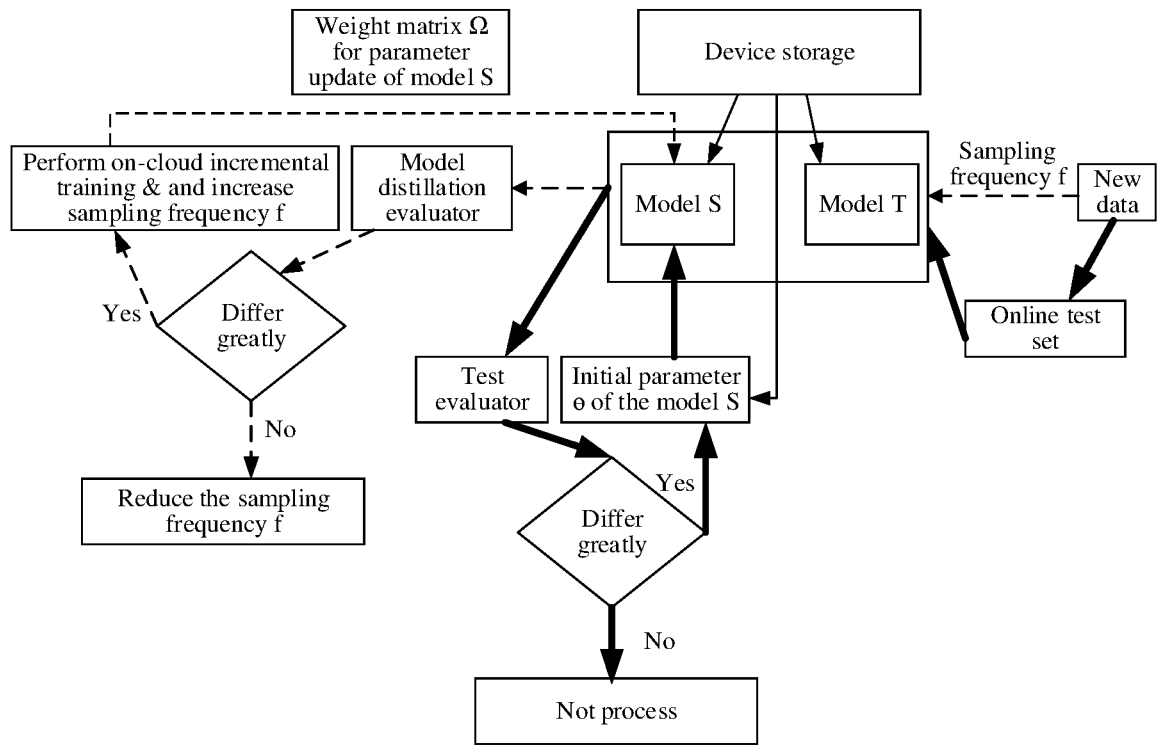
FIG. 4 is a fourth flowchart of a target object processing method according to exemplary embodiments.

FIG. 4 is a fourth flowchart of a target object processing method according to exemplary embodiments. The target object processing method is applied to a target object processing apparatus. For example, the target object processing apparatus may be executed by a terminal device, a server, or another processing device. The terminal device may be a UE, a mobile device, a cellular phone, a cordless phone, a PDA, a handheld device, a computing device, an in-vehicle device, or a wearable device. In some possible implementations, the target object processing method may be implemented in a manner in which a processor invokes computer readable instructions stored in a memory. As shown in FIG. 4, the procedure includes the following steps.

In examples, the first processing module is model T, and the second processing module is model S. The model S and the model T are deployed on an edge device, and the edge device is placed in a specific application scene. For example, in a target detection scene, sample data is trained to implement incremental learning adaptive to scene data. For example, new data is periodically selected from a test set (for example, an online test set), a preset sampling frequency f is obtained, a part of image data in the new data (indicated by a dashed arrow in FIG. 4) is selected according to the sampling frequency f, and the selected part of image data is separately input into the model S and the model T that are deployed on the edge device for prediction. The difference between the two models (the model S and the model T) is obtained by means of comparison by using a model distillation evaluator. If the prediction result output by the model T greatly differs from the prediction result output by the model S, on-cloud training on the edge device is performed on image data that greatly differs in prediction results. That is, the model S is trained and the parameter is updated by using an annotation result of outputting this frame of image by using the model T, and the sampling frequency f is increased by using the preconfigured strategy. For example, a current parameter of the model S is denoted as θ*, and in addition to a loss function in the cloud, a constraint model is obtained by means of calculation according to formula (1).

$$\lambda \Sigma_{i,j} \Omega_{ij} (\theta_{ij} - \theta_{ij}^*)^2 \qquad (1)$$

By using the constraint model, a result of on-cloud training is not forgotten. In formula (1), λ represents the importance of a solidification weight, and λ may be set to zero to abandon a solidification model. If prediction results output by the two models (the model S and the model T) slightly differ, the sampling frequency f is reduced or maintained. After accumulation of time and training pictures, the model S better adapts to an application scene. That is, an output of the model T is used for data training and learning of the model S to implement scene-adaptive incremental learning, so that the detection result adapted to scene data is obtained, and the target object is detected according to the detection result.

Moreover, the selected part of image data is preset as an online test set (represented by a bold solid arrow in FIG. 4), and the difference between the two models (the model S and the model T) is obtained by means of comparison by using a test evaluator. If the model S and the model T greatly differ in prediction results of the same online test set, a parameter θ of the original model S may be reloaded to ensure model performance. If the application scene needs to be switched, the parameter θ of the original model S may also be reloaded to ensure that the performance of the system in a new scene is not affected by the original scene.

It can be understood that the foregoing method embodiments mentioned in the present disclosure may be combined with each other to form a combined embodiment without departing from the principle and the logic. Details are not described in the present disclosure due to space limitation.

A person skilled in the art may understand that in the specific implementations of the foregoing method, the writing order of steps does not imply a strict execution order and does not constitute any limitation on implementation processes. A specific execution order of the steps should be determined according to functions and internal logic of the steps.

In addition, the present disclosure further provides a target object processing apparatus, an electronic device, a computer readable storage medium, and a program, which are used to implement any target object processing method provided in the present disclosure. For corresponding technical solutions and descriptions, reference is made to the corresponding descriptions of the method. Details are not described again.

Figure 5:
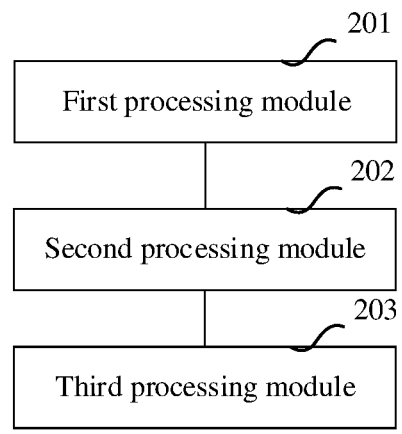
FIG. 5 is a first block diagram of a target object processing apparatus according to exemplary embodiments.

FIG. 5 is a first block diagram of a target object processing apparatus according to exemplary embodiments. As shown in FIG. 5, the target object processing apparatus in the embodiments of the present disclosure is deployed on an edge device. The apparatus includes a first processing module 201, a second processing module 202, and a third processing module 203. The first processing module 201 is configured to obtain a predicted data annotation result according to input first data. The second processing module 202 is configured to perform scene-adaptive incremental learning according to an input data annotation result to obtain a neural network adapted to a scene of second data. The third processing module 203 is configured to process a scene corresponding to a target object according to data including the target object and the neural network.

Figure 6:
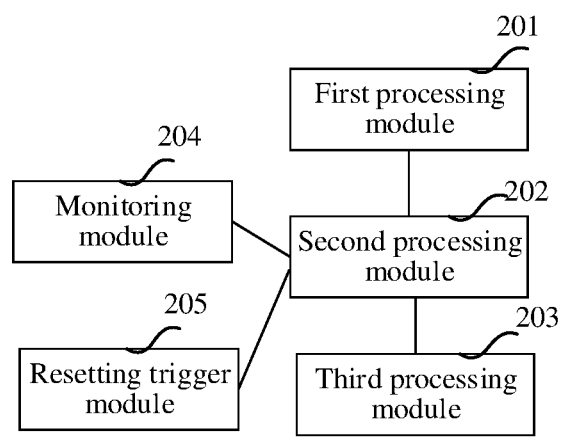
FIG. 6 is a second block diagram of a target object processing apparatus according to exemplary embodiments.

FIG. 6 is a second block diagram of a target object processing apparatus according to exemplary embodiments. As shown in FIG. 6, the target object processing apparatus in the embodiments of the present disclosure is deployed on an edge device. The apparatus includes a first processing module 201, a second processing module 202, a third processing module 203, a monitoring module 204, and a resetting trigger module 205. The first processing module 201 is configured to obtain a predicted data annotation result according to input first data. The second processing module 202 is configured to perform scene-adaptive incremental learning according to the input data annotation result to obtain a neural network adapted to a scene of second data. The third processing module 203 is configured to process a scene corresponding to a target object according to data including the target object and the neural network. The monitoring module 204 is configured to: if the scene is a current first scene, after incremental learning adaptive to the first scene is performed according to the data annotation result to obtain a neural network adapted to the first scene, monitor that the scene is switched from the first scene to a second scene. The resetting trigger module 205 is configured to trigger parameter resetting of a parameter in the second processing module 202. The second processing module 202 is further configured to perform incremental learning adaptive to the second scene according to the data annotation result to obtain a neural network adapted to the second scene.

In one possible implementation, the apparatus further includes a parameter update module 206 (not shown in FIG. 6), configured to: condition that the parameter, perform update restriction on updating of the parameter according to a constraint condition.

In one possible implementation, the first processing module 201 is further configured to: obtain a prediction rule according to prediction of scene data; and annotate the first data according to the prediction rule to obtain the predicted data annotation result.

In one possible implementation, the predicted data annotation result is derived from a first output of a data sample training network output layer constituting the first processing module; and/or the predicted data annotation result is derived from the first output of the data sample training network output layer constituting the first processing module and a second output of an intermediate layer.

In one possible implementation, the apparatus further includes a fourth processing module 207 (not shown in FIG. 6), configured to: before inputting the first data into the first processing module 201, perform selection on the first data according to a sampling parameter to obtain to-be-processed first data. The apparatus further includes a fifth processing module 208 (not shown in FIG. 6), configured to: for the to-be-processed first data, if a prediction result output by the first processing module 201 greatly differs from a prediction result output by the second processing module 202, perform scene-adaptive incremental learning on the edge device for one or more frames of the first data that greatly differ in prediction results in the to-be-processed first data.

In one possible implementation, the fifth processing module 208 is further configured to output one or more data annotation results obtained by the first processing module 201 for the one or more frames of the first data to the second processing module 202; and train the second processing module 202 and update a parameter in the second processing module 202 according to the one or more data annotation results, and increase a value of the sampling parameter by using a preconfigured strategy.

In one possible implementation, the apparatus further includes a sixth processing module 209 (not shown in FIG. 6), configured to: before inputting the first data into the first processing module 201, perform selection on the first data according to a sampling parameter to obtain to-be-processed first data. The apparatus further includes a seventh processing module 210 (not shown in FIG. 6), configured to: for the to-be-processed first data, if the prediction result output by the first processing module 201 slightly differs from the prediction result output by the second processing module 202, reduce the value of the sampling parameter by using a preconfigured strategy.

In one possible implementation, the apparatus further includes an eighth processing module 211 (not shown in FIG. 6), configured to: before inputting the first data into the first processing module 201, use a part of the first data as an online test set. The apparatus further includes a ninth processing module 212 (not shown in FIG. 6), configured to: for first data in the online test set, if the prediction result output by the first processing module 201 greatly differs from the prediction result output by the second processing module 202, reset a parameter in the second processing module 202.

In one possible implementation, the apparatus further includes: a first device monitoring module 213 (not shown in FIG. 6), configured to: after obtaining the neural network, monitor edge devices in a plurality of regions to obtain a first edge device in an idle state; and a first training processing module 214 (not shown in FIG. 6), configured to: perform adaptive incremental training adapted to the scene of the second data on the second processing module 202 according to an edge device processing capability corresponding to the first edge device.

In one possible implementation, the apparatus further includes: a second device monitoring module 215 (not shown in FIG. 6), configured to: after obtaining the neural network, monitor a plurality of edge devices in a plurality of regions to obtain a plurality of edge device processing capabilities; a device selection processing module 216 (not shown in FIG. 6), configure to: select, from the plurality of edge devices, a second edge device with a high processing capability according to the plurality of processing capabilities and current resource consumption that are respectively corresponding to the plurality of edge devices; and a second training processing module 217 (not shown in FIG. 6), configured to: perform adaptive incremental training adapted to the scene of the second data on the second processing module 202 according to an edge device processing capability corresponding to the second edge device.

In some embodiments, functions or modules included in the apparatus provided in the embodiments of the present disclosure may be configured to execute the method described in the foregoing method embodiments. For specific implementation thereof, reference is made to the descriptions of the foregoing method embodiments. For brevity, details are not described here again.

The embodiments of the present disclosure further provide a computer readable storage medium having computer program instructions stored thereon, where the foregoing method is implemented when the computer program instructions are executed by a processor. The computer readable storage medium may be a non-volatile computer readable storage medium.

The embodiments of the present disclosure further provide an electronic device, including a processor, and a memory configured to store processor executable instructions, where the processor is configured to execute the foregoing method.

Here, the electronic device may be provided as a terminal, a server, or other forms of devices.

Figure 7:
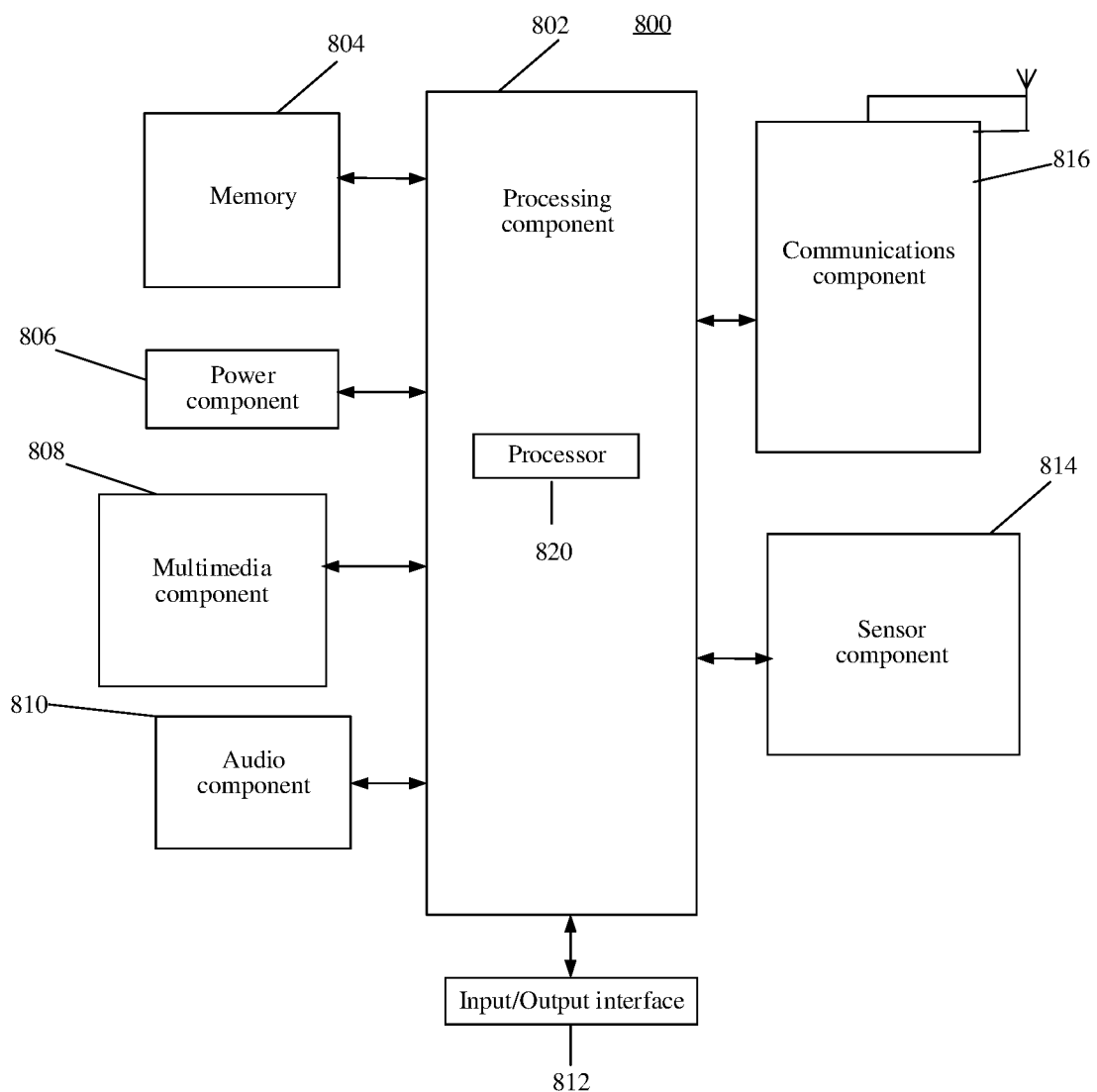
FIG. 7 is a block diagram of an electronic device 800 according to exemplary embodiments.

FIG. 7 is a block diagram of an electronic device 800 according to exemplary embodiments. For example, the electronic device 800 may be a terminal such as a mobile phone, a computer, a digital broadcast terminal, a message transceiver device, a game console, a tablet device, a medical device, a fitness device, and a PDA.

Referring to FIG. 7, the electronic device 800 may include one or more of the following components: a processing component 802, a memory 804, a power component 806, a multimedia component 808, an audio component 810, an Input/Output (I/O) interface 812, a sensor component 814, and a communications component 816.

The processing component 802 generally controls an overall operation of the electronic device 800, such as operations associated with display, a telephone call, data communication, a camera operation, and a recording operation. The processing component 802 may include one or more processors 820 to execute an instruction, to complete all or some of the steps of the foregoing method. In addition, the processing component 802 may include one or more modules, to facilitate interaction between the processing component 802 and other components. For example, the processing component 802 includes a multimedia module, to facilitate interaction between the multimedia component 808 and the processing component 802.

The memory 804 is configured to store data of various types to support operations on the electronic device 800. For example, the data includes an instruction, contact data, phone book data, a message, an image, or a video of any application program or method operated on the electronic device 800. The memory 804 is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power component 806 supplies power to the components of the electronic device 800. The power component 806 may include a power management system, one or more power supplies, and other components associated with power generation, management, and distribution for the electronic device 800.

The multimedia component 808 includes a screen between the electronic device 800 and a user to provide an output interface. In some embodiments, the screen may include a Liquid Crystal Display (LCD) and a Touch Panel (TP). If the screen includes the TP, the screen is implemented as a touchscreen, to receive an input signal from the user. The TP includes one or more touch sensors to sense a touch, a slide, and a gesture on the TP. The touch sensor may not only sense a boundary of a touch action or a slide action, but also detect the duration and pressure related to the touch operation or the slide operation. In some embodiments, the multimedia component 808 includes a front-facing camera and/or a rear-facing camera. When the electronic device 800 is in an operation mode, for example, a photographing mode or a video mode, the front-facing camera and/or the rear-facing camera may receive external multimedia data. Each front-facing camera or rear-facing camera is a fixed optical lens system or has a focal length and an optical zoom capability.

The audio component 810 is configured to output and/or input an audio signal. For example, the audio component 810 includes one microphone (MIC for short). When the electronic device 800 is in an operation mode, such as a call mode, a recording mode, or a voice recognition mode, the microphone is configured to receive an external audio signal. The received audio signal is further stored in the memory 804 or sent by means of the communications component 816. In some embodiments, the audio component 810 further includes one speaker, configured to output an audio signal.

The I/O interface 812 provides an interface between the processing component 802 and a peripheral interface module, and the peripheral interface module is a keyboard, a click wheel, a button, or the like. These buttons may include but are not limited to a home button, a volume button, a startup button, and a lock button.

The sensor component 814 includes one or more sensors, and is configured to provide status evaluation in various aspects for the electronic device 800. For example, the sensor component 814 may detect an on/off state of the electronic device 800 and relative positioning of the components, for example, the components are a display and a keypad of the electronic device 800. The sensor component 814 may also detect a location change of the electronic device 800 or a component of the electronic device 800, existence or nonexistence of contact between the user and the electronic device 800, an orientation or acceleration/deceleration of the electronic device 800, and a temperature change of the electronic device 800. The sensor component 814 may include a proximity sensor, configured to detect existence of a nearby object when there is no physical contact. The sensor component 814 may further include an optical sensor, such as a Complementary Metal-Oxide-Semiconductor (CMOS) image sensor or a Charge Coupled Device (CCD) image sensor, that is used in an imaging application. In some embodiments, the sensor component 814 may further include an acceleration sensor, a gyro sensor, a magnetic sensor, a pressure sensor, or a temperature sensor.

The communications component 816 is configured to facilitate wired or wireless communication between the electronic device 800 and other devices. The electronic device 800 is connected to a communication standard-based wireless network, such as Wi-Fi, 2G or 3G, or a combination thereof. In exemplary embodiments, the communications component 816 receives a broadcast signal or broadcast-related information from an external broadcast management system through a broadcast channel. In exemplary embodiments, the communications component 816 further includes a Near Field Communication (NFC) module, to promote short-range communication. For example, the NFC module is implemented according to a Radio Frequency Identification (RFID) technology, an Infrared Data Association (IrDA) technology, an Ultra Wideband (UWB) technology, a Bluetooth (BT) technology, and other technology.

In exemplary embodiments, the electronic device 800 is implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and is configured to perform the foregoing method.

In exemplary embodiments, a non-volatile computer readable storage medium, for example, the memory 804 including a computer program instruction, is further provided. The computer program instruction is executed by the processor 820 of the electronic device 800 to complete the foregoing method.

Figure 8:
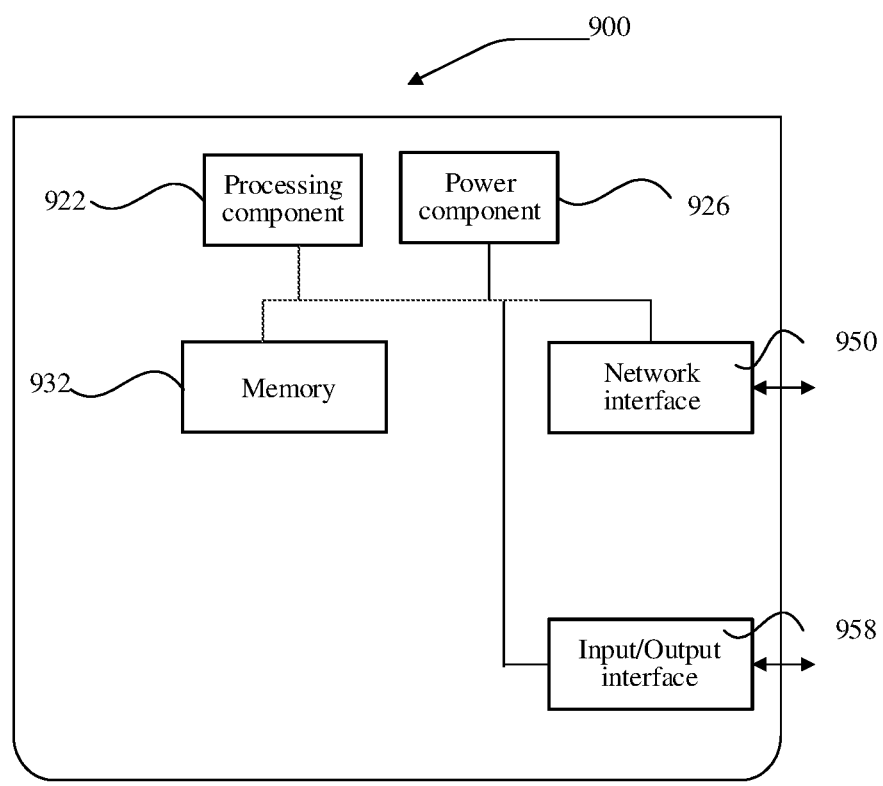
FIG. 8 is a block diagram of an electronic device 900 according to exemplary embodiments.

FIG. 8 is a block diagram of an electronic device 900 according to an exemplary embodiment. For example, the electronic device 900 may be provided as a server. Referring to FIG. 8, the electronic device 900 includes a processing component 922 that further includes one or more processors; and a memory resource represented by a memory 932, configured to store instructions, for example, an application program, that can be executed by the processing component 922. The application program stored in the memory 932 may include one or more modules that each correspond to a set of instructions. In addition, the processing component 922 is configured to execute the instructions to perform the foregoing method.

The electronic device 900 may further include: a power supply component 926, configured to perform power management of the electronic device 900; a wired or wireless network interface 950, configured to connect the electronic device 900 to a network; and an I/O interface 958. The electronic device 900 may operate an operating system stored in the memory 932, such as Windows Server™, Mac OS X™, Unix™, Linux™, or FreeBSD™.

In exemplary embodiments, also provided is a non-volatile computer readable storage medium, e.g., a memory 932 including a computer program instruction. The computer program instruction is executed by the processing component 922 of the electronic device 900 to complete the foregoing method.

The present disclosure may be a system, a method, and/or a computer program product. The computer program product may include a computer readable storage medium, on which computer readable program instructions used by the processor to implement various aspects of the present disclosure are stored.

The computer readable storage medium is a tangible device that can maintain and store instructions used by an instruction execution device. For example, the computer readable storage medium may be, but not limited to, an electrical storage device, a magnetic storage device, an optical storage device, an electromagnetic storage device, a semiconductor storage device, or any appropriate combination thereof. More specific examples (a non-exhaustive list) of the computer readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer readable program instruction described here is downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer readable program instruction from the network, and forwards the computer readable program instruction, so that the computer readable program instruction is stored in a computer readable storage medium in each computing/processing device.

Computer program instructions for executing the operations of the present disclosure are compilation instructions, Instruction Set Architecture (ISA) instructions, machine instructions, machine-related instructions, microcode, firmware instructions, status setting data, or source code or target code written in any combination of one or more programming languages. The programming languages include an object-oriented programming language such as Smalltalk or C++, and a conventional procedural programming language such as the "C" language or a similar programming language. The program readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including a Local Area Network (LAN) or a Wide Area Network (WAN), or may be connected to an external computer (for example, connected via the Internet with the aid of an Internet service provider).

In some embodiments, an electronic circuit such as a programmable logic circuit, a Field Programmable Gate Array (FPGA), or a Programmable Logic Array (PLA) is personalized by using status information of the computer readable program instructions, and the electronic circuit can execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer readable program instructions.

These computer readable program instructions may be provided for a general-purpose computer, a dedicated computer, or a processor of another programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer readable program instructions may also be stored in a computer readable storage medium, and these instructions instruct a computer, a programmable data processing apparatus, and/or other devices to work in a specific manner. Therefore, the computer readable storage medium having the instructions stored thereon includes a manufacture, and the manufacture includes instructions for implementing specified functions/actions in one or more blocks in the flowcharts and/or block diagrams.

The computer readable program instructions may also be loaded onto a computer, other programmable data processing apparatuses, or other devices, so that a series of operations and steps are executed on the computer, the other programmable apparatuses, or the other devices, thereby generating computer-implemented processes. Therefore, the instructions executed on the computer, the other programmable apparatuses, or the other devices implement the specified functions/actions in the one or more blocks in the flowcharts and/or block diagrams.

The flowcharts and block diagrams in the accompanying drawings show architectures, functions, and operations that may be implemented by the systems, methods, and computer program products according to the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

INDUSTRIAL APPLICABILITY

According to the technical solutions in the embodiments of the present disclosure, first data is input into the first processing module to obtain the predicted data annotation result; the data annotation result is input into the second processing module, and scene-adaptive incremental learning is performed according to the data annotation result to obtain the neural network adapted to the scene of the second data; and the scene corresponding to the target object is processed according to data including the target object and the neural network. Therefore, the scene corresponding to the target object is processed according to the data including the target object and the neural network, and the difference between obtained training data and data in an actual application scene is not large. In this way, a processing requirement of an application scene is met, and costs are reduced.

The invention claimed is:

1. A target object processing method, wherein the method is applied to an edge device, and a first processing module for annotation of first data and a second processing module for adaptation of a scene indicated by second data are deployed on the edge device; and the method comprises:
  inputting the first data into the first processing module to obtain a predicted data annotation result;
  inputting the predicted data annotation result into the second processing module, and performing scene-adaptive incremental learning according to the predicted data annotation result to obtain a neural network adapted to the scene indicated by the second data; and
  processing a scene corresponding to a target object according to the neural network and data comprising the target object,
  wherein the scene corresponding to the target object is a first scene, and the method further comprises:
    responsive to monitoring that the scene corresponding to the target object is switched from the first scene to a second scene, triggering parameter resetting of a parameter in the second processing module.

2. The method according to claim 1, further comprising:
performing incremental learning adaptive to the first scene according to the predicted data annotation result to obtain a neural network adapted to the first scene;
wherein after triggering parameter resetting of the parameter in the second processing module, the method further comprises:
  performing incremental learning adaptive to the second scene according to the predicted data annotation result to obtain a neural network adapted to the second scene.

3. The method according to claim 1, further comprising:
before obtaining the neural network,
  when the parameter in the second processing module is to be updated, performing update restriction on updating of the parameter according to a constraint condition.

4. The method according to claim 1, wherein inputting the first data into the first processing module to obtain the predicted data annotation result comprises:
  obtaining, according to prediction of scene data by the first processing module, a prediction rule; and
  annotating the first data according to the prediction rule to obtain the predicted data annotation result.

5. The method according to claim 1, wherein at least one of:
  the predicted data annotation result is derived from a first output of an output layer, constituting the first processing module, in a data sample training network; or
  the predicted data annotation result is derived from the first output of the output layer, constituting the first processing module, and a second output of an intermediate layer in the data sample training network.

6. The method according to claim 1, further comprising:
after obtaining the neural network,
  monitoring a plurality of edge devices in a plurality of regions to obtain a first edge device in an idle state; and
  performing adaptive incremental training adapted to the scene indicated by the second data on the second processing module according to an edge device processing capability corresponding to the first edge device, or
after obtaining the neural network,
  monitoring the plurality of edge devices in the plurality of regions to obtain a plurality of edge device processing capabilities;
  selecting, from the plurality of edge devices, a second edge device with a highest edge device processing capability according to the plurality of edge device processing capabilities respectively corresponding to the plurality of edge devices and a current resource consumption; and
  performing the adaptive incremental training adapted to the scene indicated by the second data on the second processing module according to an edge device processing capability corresponding to the second edge device.

7. A target object processing apparatus, deployed on an edge device, and comprising a processor and a memory for storing instructions executable by the processor, wherein the processor is configured to:
  obtain a predicted data annotation result according to input first data in a first processing module;
  perform scene-adaptive incremental learning according to the predicted data annotation result input into a second processing module to obtain a neural network adapted to a scene indicated by second data; and
  process a scene corresponding to a target object according to the neural network and data comprising the target object,
  wherein the scene corresponding to the target object is a first scene, and the processor is further configured to:
    responsive to monitoring that the scene corresponding to the target object is switched from the first scene to a second scene, trigger parameter resetting of a parameter in the second processing module.

8. The apparatus according to claim 7, wherein the processor is configured to:
  perform incremental learning adaptive to the first scene according to the predicted data annotation result to obtain a neural network adapted to the first scene;
  wherein after triggering parameter resetting of the parameter in the second processing module, the processor is further configured to:
    perform incremental learning adaptive to the second scene according to the predicted data annotation result to obtain a neural network adapted to the second scene.

9. The apparatus according to claim 7, wherein the processor is configured to:
  when the parameter in the second processing module is to be updated, perform update restriction on updating of the parameter according to a constraint condition.

10. The apparatus according to claim 7, wherein the processor is further configured to:
  obtain a prediction rule according to prediction of scene data; and
  annotate the first data according to the prediction rule to obtain the predicted data annotation result.

11. The apparatus according to claim 7, wherein at least one of:
  the predicted data annotation result is derived from a first output of an output layer, constituting the first processing module, in a data sample training network; or
  the predicted data annotation result is derived from the first output of the output layer, constituting the first processing module, and a second output of an intermediate layer in the data sample training network.

12. The apparatus according to claim 7, wherein the processor is configured to:
after obtaining the neural network,
monitor a plurality of edge devices in a plurality of regions to obtain a first edge device in an idle state; and perform adaptive incremental training adapted to the scene indicated by the second data on the second processing module according to an edge device processing capability corresponding to the first edge device, or after obtaining the neural network,
monitor the plurality of edge devices in the plurality of regions to obtain a plurality of edge device processing capabilities;
select, from the plurality of edge devices, a second edge device with a highest edge device processing capability according to the plurality of edge device processing capabilities respectively corresponding to the plurality of edge devices and a current resource consumption; and
perform the adaptive incremental training adapted to the scene indicated by the second data on the second processing module according to an edge device processing capability corresponding to the second edge device.

13. A non-transitory computer storage medium having executable instructions stored therein, wherein the executable instructions, when being executed by a processor, enable the processor to implement a target object processing method, wherein the method is applied to an edge device, and a first processing module for annotation of first data and a second processing module for adaptation of a second data scene are deployed at the edge device, and
the method comprising:
inputting the first data into the first processing module to obtain a predicted data annotation result;
inputting the predicted data annotation result into the second processing module, and performing scene-adaptive incremental learning according to the predicted data annotation result to obtain a neural network adapted to the second data scene; and
processing a scene corresponding to a target object according to the neural network and data comprising the target object,
wherein the scene corresponding to the target object is a first scene, and the method further comprises:
responsive to monitoring that the scene corresponding to the target object is switched from the first scene to a second scene, triggering parameter resetting of a parameter in the second processing module.

* * * * *